US012185652B2

(12) United States Patent
Kim et al.

(10) Patent No.: US 12,185,652 B2
(45) Date of Patent: Jan. 7, 2025

(54) SYSTEM FOR AUTOMATICALLY ROTATING STEERING WHEEL OF AGRICULTURAL MACHINE

(71) Applicant: GINT CO., LTD., Gyeonggi-do (KR)

(72) Inventors: Yong Hyeon Kim, Gyeonggi-do (KR); Seung Rak Son, Gyeonggi-do (KR); Yeon Tae Kim, Seoul (KR)

(73) Assignee: GINT CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/633,729

(22) Filed: Apr. 12, 2024

(65) Prior Publication Data

US 2024/0251697 A1 Aug. 1, 2024

Related U.S. Application Data

(63) Continuation of application No. PCT/KR2021/017265, filed on Nov. 23, 2021.

(30) Foreign Application Priority Data

Oct. 15, 2021 (KR) .................. 10-2021-0137136

(51) Int. Cl.
*A01B 69/04* (2006.01)
(52) U.S. Cl.
CPC ................. *A01B 69/008* (2013.01)
(58) Field of Classification Search
CPC .............................. A01B 69/008; A01B 69/04
USPC ............................................................ 701/23
See application file for complete search history.

(56) References Cited

U.S. PATENT DOCUMENTS

| 7,574,290 B2 * | 8/2009 | Gibson ................ G05D 1/0278 701/413 |
| 2006/0116798 A1 * | 6/2006 | Gibson ................ G05D 1/0061 701/466 |
| 2008/0294309 A1 * | 11/2008 | Kaprielian ............. G05D 1/027 342/357.31 |
| 2012/0006605 A1 * | 1/2012 | Warachka ................ B66F 9/08 180/65.6 |
| 2012/0181095 A1 * | 7/2012 | Lopez ..................... B60L 8/003 180/2.2 |
| 2018/0037257 A1 * | 2/2018 | Ichinose .................. G01L 5/221 |
| 2019/0248403 A1 * | 8/2019 | Lubischer ................ B62D 1/28 |
| 2022/0185092 A1 * | 6/2022 | Payne ...................... B60K 6/40 |

(Continued)

FOREIGN PATENT DOCUMENTS

| CA | 3101827 A1 * | 6/2021 | .......... B60K 7/0007 |
| CA | 3101833 A1 * | 6/2021 | .......... B60B 35/006 |

(Continued)

OTHER PUBLICATIONS

International Search Report for corresponding PCT/KR2021/017265, mailed Jun. 27, 2022, 3 pgs.

(Continued)

*Primary Examiner* — Atul Trivedi
(74) *Attorney, Agent, or Firm* — Guntin & Gust, PLC; Miyoung Shin

(57) ABSTRACT

The present disclosure relates to a system for automatically rotating a steering wheel of an agricultural machine. Particularly, the present disclosure relates to a system for enabling autonomous driving of an agricultural machine by being coupled to a steering wheel of the agricultural machine to automatically rotate the steering wheel.

5 Claims, 7 Drawing Sheets

(56) References Cited

U.S. PATENT DOCUMENTS

| | | | | |
|---|---|---|---|---|
| 2022/0185106 A1* | 6/2022 | Payne | ................. | B60K 1/00 |
| 2024/0101184 A1* | 3/2024 | Battlogg | ................. | G05G 5/03 |
| 2024/0116563 A1* | 4/2024 | Schoon | ................. | B62D 5/0448 |

FOREIGN PATENT DOCUMENTS

| | | | | | |
|---|---|---|---|---|---|
| CN | 107428366 A | * | 12/2017 | | |
| CN | 108313116 A | * | 7/2018 | | |
| CN | 110703756 A | * | 1/2020 | | |
| CN | 113147628 A | * | 7/2021 | | |
| CN | 114537461 A | * | 5/2022 | | |
| CN | 115303361 A | * | 11/2022 | ........ | B60W 60/0055 |
| CN | 115402400 A | * | 11/2022 | ........ | B62D 5/006 |
| CN | 218577838 U | * | 3/2023 | | |
| EP | 3395140 A1 | * | 10/2018 | | |
| EP | 3626502 B1 | * | 2/2022 | ........ | B60K 1/00 |
| JP | 2020000166 A | * | 1/2020 | | |
| JP | 2020164048 A | * | 10/2020 | | |
| JP | 2020164049 A | * | 10/2020 | | |
| JP | 2021075140 A | | 5/2021 | | |
| KR | 10-2007-0104764 | | 10/2007 | | |
| KR | 10-0764198 B1 | | 10/2007 | | |
| KR | 10-1181017 B1 | | 9/2012 | | |
| KR | 10-1586636 B1 | | 1/2016 | | |
| KR | 2406547 B1 | * | 6/2022 | | |
| KR | 2406549 B1 | * | 6/2022 | | |
| RU | 2796264 C1 | * | 5/2023 | | |
| WO | WO-2009130421 A2 | * | 10/2009 | ........ | A01B 39/18 |
| WO | WO-2010139013 A1 | * | 12/2010 | ........ | A01B 69/008 |
| WO | 2017060958 A1 | | 4/2017 | | |
| WO | WO-2018041330 A1 | * | 3/2018 | | |
| WO | WO-2022079030 A1 | * | 4/2022 | ........ | B62D 5/006 |
| WO | WO-2024078961 A1 | * | 4/2024 | | |
| WO | WO-2024078963 A1 | * | 4/2024 | ........ | B62D 5/0424 |

OTHER PUBLICATIONS

Office Action for corresponding Korean Application No. 10-2021-0137136, mailed Dec. 28, 2021, 5 pgs.

* cited by examiner

SYSTEM FOR AUTOMATICALLY ROTATING STEERING WHEEL OF AGRICULTURAL MACHINE

CROSS-REFERENCE TO RELATED APPLICATION(S)

The present application is a continuation of, and claims priority to, PCT Patent Application No. PCT/KR2021/017265 filed Nov. 23, 2021, which claims priority to Korean Patent Application No. 10-2021-0137136 filed on Oct. 15, 2021, the disclosures of which are hereby incorporated herein by reference in their entirety.

FIELD OF THE DISCLOSURE

The present disclosure relates to a system for automatically rotating a steering wheel of an agricultural machine. In detail, the present disclosure relates to a system for performing autonomous driving on an agricultural machine by automatically rotating a steering wheel in combination with a steering wheel of the agricultural machine.

BACKGROUND

Agricultural machines are treated as very important elements to reduce high labor burden and production costs in accordance with labor shortage due to a decrease in and aging of a working population in rural areas. The agricultural machines are intended to perform various works required for farming, capable of performing various types of works such as plowing, rotary work, pest control, and transplanting work, and classified into a walking-type working machine that a worker operates while walking together with the agricultural machine and a riding-type working machine that the worker operates while sitting in a driver seat provided on the agricultural machine.

In recent years, with introduction of driving assistance systems such as an advanced driver assistance system (ADAS) function in a vehicle field, research and development on autonomous driving is being conducted. The autonomous driving is also introduced to the agricultural machines having mechanisms similar to vehicles, and thus research and development on a device and method for more efficiently performing agricultural work is being conducted.

One of parts for automating the agricultural works using the agricultural machines is automatically performing steering. In most agricultural machines, the steering is performed through a steering wheel, and control of the steering wheel without human intervention is required for the autonomous driving of the agricultural machines. Thus, a system for automatically controlling a steering wheel of an agricultural machine is required.

With the development of a wireless communication technology, a telematics device that is electrically connected to the agricultural machine and can perform wireless communication for agricultural machine-related state and control information with a server of an agricultural machine manufacturer is being popularized. When the telematics device is used, a user can control an operation of the agricultural machine without directly approaching the agricultural machine. The control of the steering wheel for the agricultural machine may be used as remote steering wheel control as the agricultural machine is combined with a communication system. Thus, a system for remotely and automatically controlling a steering wheel of an agricultural machine through a wireless communication is required.

In Western countries such as the United States, an agricultural environment is field-oriented and roads are well paved. However, in Korea and Asian countries, the agricultural environment is rice field-oriented as in rice farming, and roads around the rice field are often unpaved. In the rice field or reclaimed land, wheels of the agricultural machine are largely submerged in mud, and thus a torque required for controlling the steering wheel of the agricultural machine in the rice field or reclaimed land is significantly greater than a torque required for controlling the steering wheel of the agricultural machine on a paved road or field. Thus, a system for adjusting a torque for controlling a steering wheel according to the type of land in which an agricultural machine is located to perform the works is required.

SUMMARY

The present disclosure is directed to providing a system for automatically rotating a steering wheel of an agricultural machine.

The present disclosure is also directed to providing a system that is coupled to a steering wheel of an agricultural machine, automatically rotates the steering wheel, and thus performs autonomous driving of the agricultural machine.

The present disclosure is also directed to providing a system for automatically controlling a steering wheel of an agricultural machine.

The present disclosure is also directed to providing a system for remotely and automatically controlling a steering wheel of an agricultural machine through wireless communication.

The present disclosure is also directed to providing a system capable of adjusting a torque for controlling a steering wheel depending on the type of a land on which an agricultural machine is positioned to perform work.

One aspect of the present disclosure provides a system for automatically rotating a steering wheel of an agricultural machine, the system including an auto-steering device, wherein the auto-steering device includes a rotation assembly surrounding a circumference of a pillar of the steering wheel and coupled to the pillar, wherein a first gear is disposed on a circumference of the rotation assembly, a frame assembly including a central opening surrounding the steering wheel and the rotation assembly, wherein a second gear engaged with the first gear is disposed on an inner surface of the central opening, a motor that rotates the second gear to rotate the rotation assembly and the steering wheel through the first gear, and a reducer that is disposed between the second gear and the motor and decreases the number of rotations of the motor to transmit a driving force having a decreased number of rotations to the second gear.

The system may further include a controller device electrically connected to the auto-steering device, wherein the controller device may include a processor, a memory, a transceiver, and a global positioning system (GPS) sensor, and the processor may control the transceiver to receive autonomous driving control information from a user terminal and control the motor and the reducer based on the autonomous driving control information.

Various embodiments of the present disclosure can provide a system for automatically rotating a steering wheel of an agricultural machine.

Various embodiments of the present disclosure can provide a system that is coupled to a steering wheel of an agricultural machine, automatically rotates the steering wheel, and thus performs autonomous driving of the agricultural machine.

Various embodiments of the present disclosure can provide a system for automatically controlling a steering wheel of an agricultural machine.

Various embodiments of the present disclosure can provide a system for remotely and automatically controlling a steering wheel of an agricultural machine through wireless communication.

Various embodiments of the present disclosure can provide a system capable of adjusting a torque for controlling a steering wheel depending on the type of a land on which an agricultural machine is positioned to perform work.

The effects obtained in the present disclosure are not limited to the effects described above, and other effects not described will be clearly understood by those skilled in the art to which the present disclosure pertains from the following description.

BRIEF DESCRIPTION OF THE DRAWINGS

Reference will now be made to the accompanying drawings, which are not necessarily drawn to scale, and wherein.

DETAILED DESCRIPTION

Terms used herein are merely used to describe specific embodiments and may not be intended to limit the scope of other embodiments. Singular expressions may include plural expressions unless clearly otherwise indicated in the context. Terms used herein including technical or scientific terms have the same meanings as those commonly understood by those skilled in the art disclosed in the present disclosure. Terms defined in a general dictionary among the terms used herein may be interpreted as the same or similar meanings as the meanings in the context of the related art and are not interpreted as ideal or excessively formal meanings unless explicitly defined herein. In some cases, even terms defined therein may not be interpreted to exclude embodiments of the present disclosure.

Figure 1A:
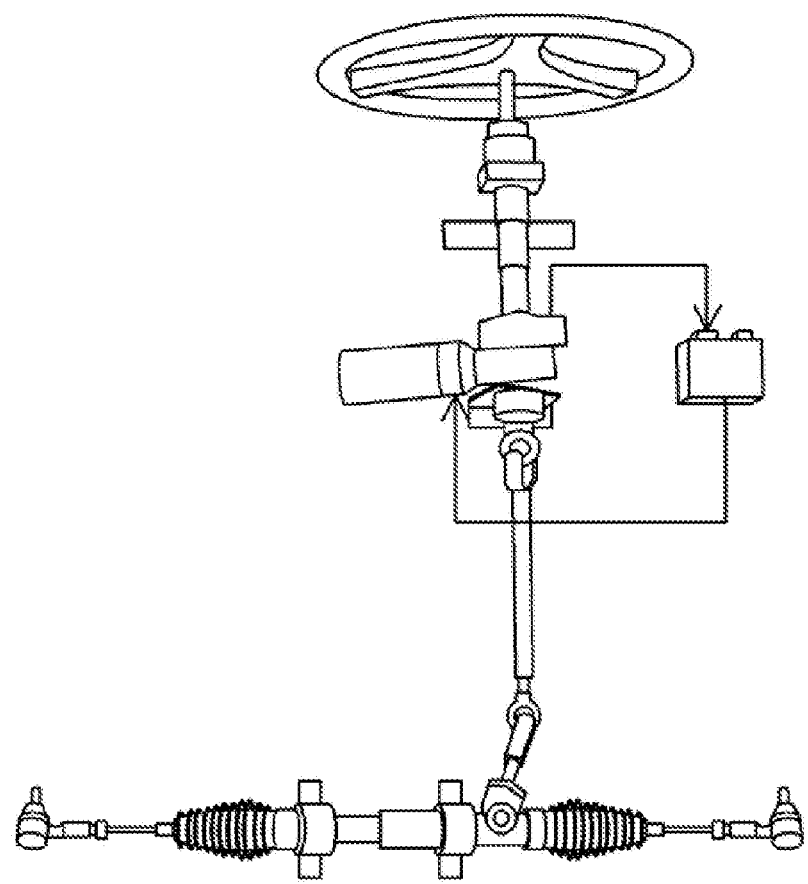
FIG. 1A is a view illustrating an example of a steering method for a vehicle.

FIG. 1A is a view illustrating an example of a steering method for a vehicle.

In detail, FIG. 1A illustrates a motor driven power steering (MDPS)-type electric power steering.

Figure 1B:
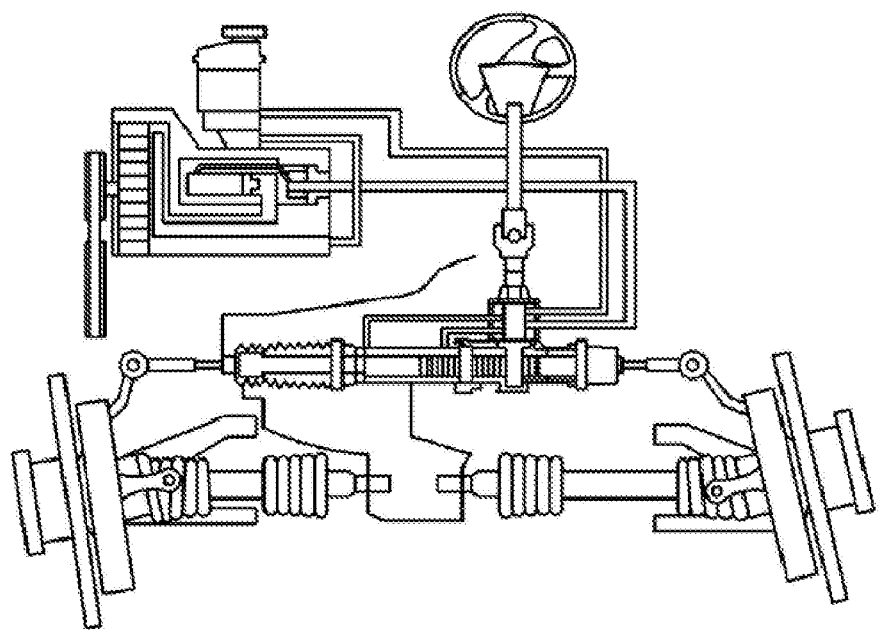
FIG. 1B is a view illustrating an example of a steering method for a vehicle.

FIG. 1B is a view illustrating an example of a steering method for a vehicle.

In detail, FIG. 1B illustrates a hydraulic power steering (HPS)-type hydraulic power steering.

Steering devices of previously released agricultural machines such as tractors and rice transplanters are designed to use the HPS method rather than the MDPS method.

The MDPS method is an electric power steering method using a motor. Since the motor is driven using an electrical battery, unlike the HPS method, fuel efficiency is not affected, and oil change is not required. Further, the number of components is small, which is advantageous in securing a space, and a price is also relatively inexpensive. The MDPS is most widely used because the MDPS is mounted on a recently emerging autonomous driving vehicle to implement functions such as driving and parking assistance. Further, since a steering force may be adjusted according to a driving mode (a comfort mode, an eco-mode, a sport mode, an individual mode, or the like), a user can drive the vehicle using responsiveness appropriate to a situation.

The HPS method is a hydraulic power steering method. Since the HPS method is a mechanical method without intervention of electronic equipment, the HPS method is highly responsive. However, since the HPS method is a hydraulically operated system, power oil should be maintained periodically. Further, since the HPS method should operate the power oil, fuel efficiency is adversely affected. Further, since the HPS method requires many parts and a large space for constituting the system, the HPS method is not applied to a recently manufactured vehicle.

The MDPS method is a system mainly applied in a vehicle. Among MDPS methods, a column type MDPS (C-MDPS) method steering includes a torque sensor/reducer/driving motor/controller on a column axis, calculates a torque required by a driver based on a torsional amount of the driver, and transmits a final torque to the wheels in consideration of vehicle speed information and the like.

On the other hand, since most agricultural machines are configured in the HPS method, automatic control of the steering wheel cannot be performed without external device for rotating a steering wheel.

Thus, according to various embodiments of the present disclosure, an auto steering device in which a mechanism that may externally rotate a steering wheel of an agricultural machine is introduced, the auto steering system is compatible with the agricultural machines such as the tractors and the rice transplanters released in the past, the steering wheel for the agricultural machine using the HPS method is automatically controlled, and thus agricultural works are automatically performed is provided.

Figure 2:
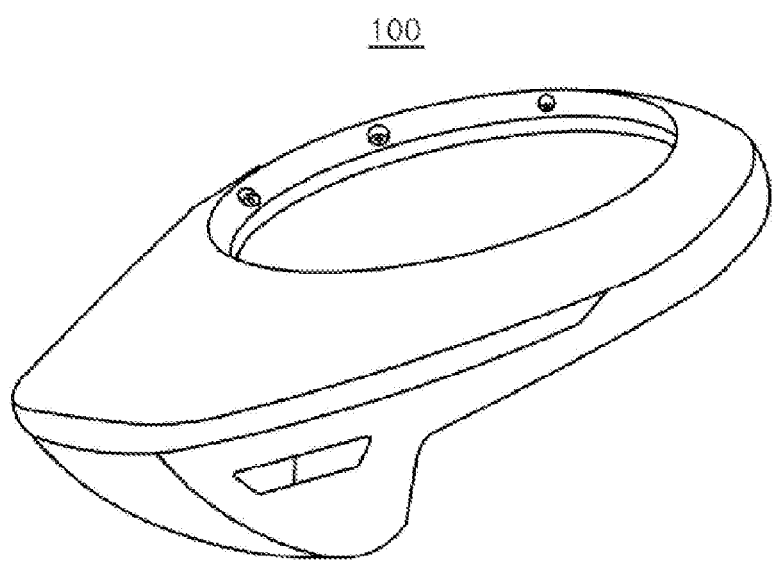
FIG. 2 is view illustrating an exterior of an auto-steering device according to various embodiments of the present disclosure.

FIG. 2 is view illustrating an exterior of an auto-steering device according to various embodiments of the present disclosure.

The auto-steering device of FIG. 2 includes an opening that may be coupled to a pillar of the steering wheel of the agricultural machine. The auto-steering device is configured to rotate the steering wheel under control of an electrically coupled controller device.

Figure 3:
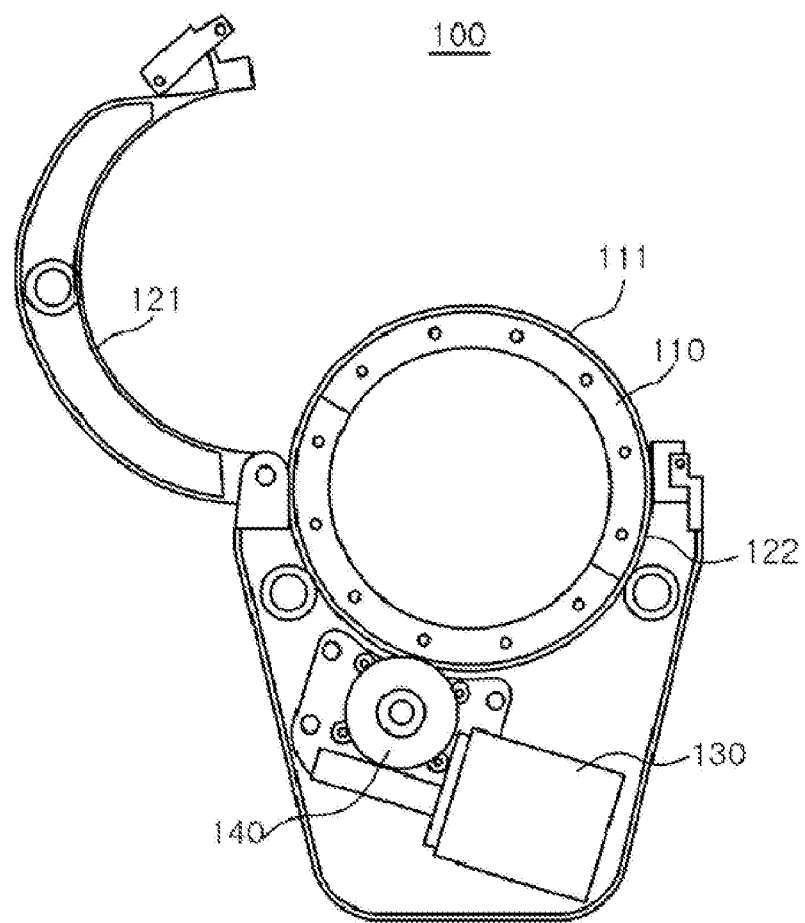
FIG. 3 is view illustrating an interior of an auto-steering device according to various embodiments of the present disclosure.

FIG. 3 is view illustrating an interior of an auto-steering device according to various embodiments of the present disclosure.

In detail, FIG. 3 illustrates an interior in an open state of an auto-steering device 100.

Referring to FIG. 3, the auto-steering device 100 includes a rotation assembly 110, a frame assembly 120, a motor 130, and a reducer 140.

The rotation assembly 110 includes an opening in an inner surface thereof, and the opening surrounds a circumference of the pillar of the steering wheel of the agricultural machine and is fitted onto the pillar of the steering wheel. The rotation assembly 110 has a first gear 111 disposed on an outer surface thereof.

The frame assembly 120 includes a central opening surrounding the steering wheel and the rotation assembly 110, and second gears 121 and 122 are arranged on an inner surface of the central opening. The second gears 121 and 122 are configured to be engaged with the first gear 111. The frame assembly 120 may be opened or closed. After the rotation assembly 110 is coupled to the pillar of the steering wheel, when the driver wants to automatically control the steering wheel using the auto-steering device 100, the frame assembly 120 is coupled to the rotation assembly 110, and when the driver of the agricultural machine wants to manually control the steering wheel without the auto-steering device 100, the frame assembly 120 is not coupled to the rotation assembly 110. One 121 of the second gears is disposed on an open portion of the frame assembly 120, and the other 122 of the second gears is disposed on a body portion of the frame assembly 120. When the frame assembly 120 is closed, the one 121 of the second gears and the other 122 of the second gears together constitute a circular shape.

The motor 130 is disposed inside the frame assembly 120. The motor 130 is configured to rotate the second gears 121 and 122, rotate the rotation assembly 110 coupled to the pillar of the steering wheel through the first gear 111 engaged with the second gears 121 and 122, and accordingly, rotate the steering wheel. The motor 130 operates under control of a controller device 200 that is electrically connected to the auto-steering device 100.

The reducer 140 is disposed inside the frame assembly 120. The reducer 140 is disposed between the second gears 121 and 122 and the motor 130. The reducer 140 is configured to decrease the number of rotations of the motor 130 and transmit a driving force having a decreased number of rotations to the second gears 121 and 122. The reducer 140 operates under the control of the controller device 200 that is electrically connected to the auto-steering device 100.

Figure 4:
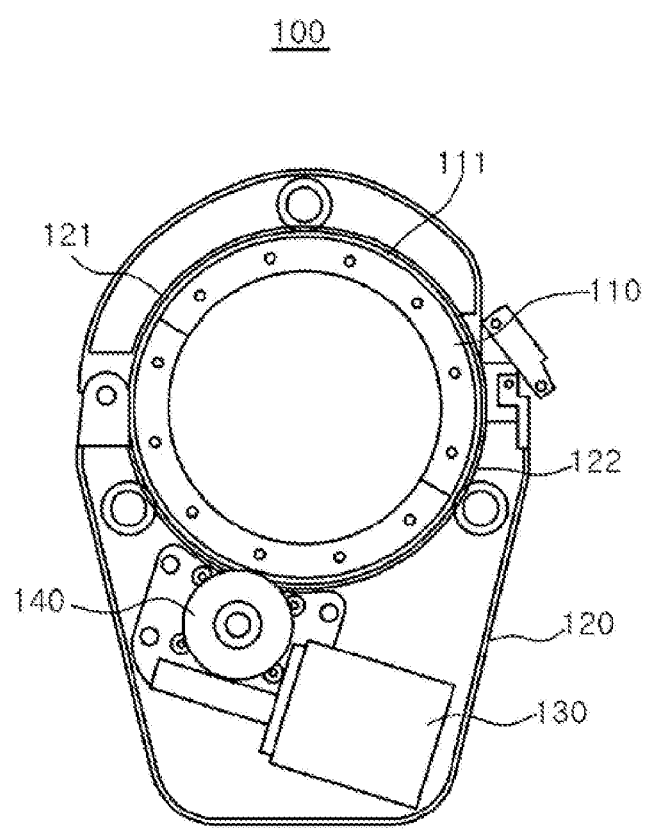
FIG. 4 is view illustrating an interior of an auto-steering device according to various embodiments of the present disclosure.

FIG. 4 is view illustrating an interior of an auto-steering device according to various embodiments of the present disclosure.

In detail, FIG. 4 illustrates the interior in a closed state of the auto-steering device 100.

Referring to FIG. 4, the auto-steering device 100 includes the rotation assembly 110, the frame assembly 120, the motor 130, and the reducer 140. A detailed configuration of the auto-steering device 100 is the same as that previously described in FIG. 3.

The auto-steering device 100 may be opened or closed as the frame assembly 120 is opened or closed.

The frame assembly 120 may be opened or closed. After the rotation assembly 110 is coupled to the pillar of the steering wheel, when the driver wants to automatically control the steering wheel using the auto-steering device 100, the frame assembly 120 is coupled to the rotation assembly 110, and when the driver of the agricultural machine wants to manually control the steering wheel without the auto-steering device 100, the frame assembly 120 is not coupled to the rotation assembly 110. One 121 of the second gears is disposed on an open portion of the frame assembly 120, and the other 122 of the second gears is disposed on a body portion of the frame assembly 120. When the frame assembly 120 is closed, the one 121 of the second gears and the other 122 of the second gears together constitute a circular shape.

Figure 5:
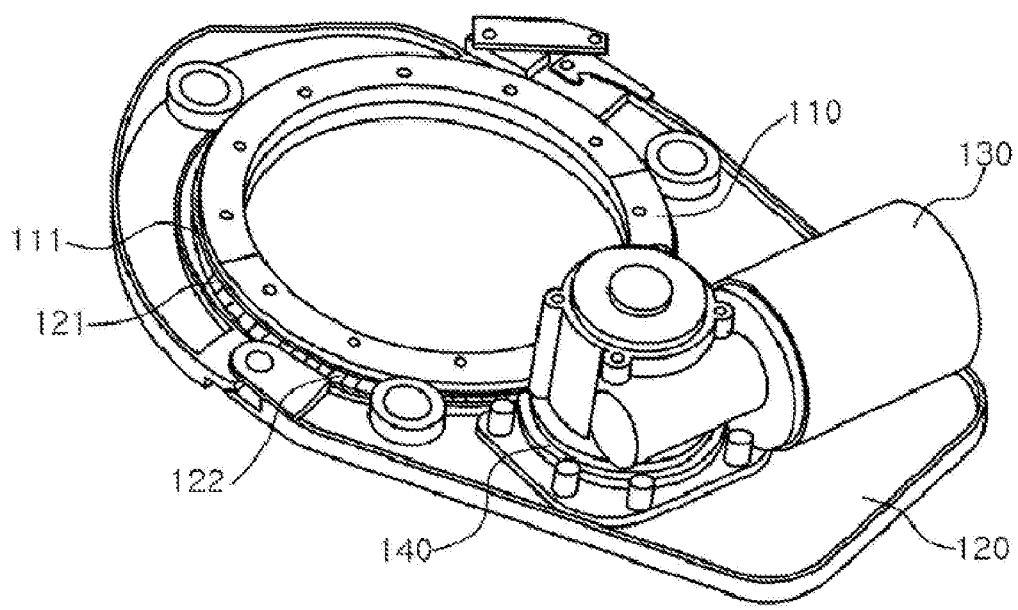
FIG. 5 is view illustrating an interior of an auto-steering device according to various embodiments of the present disclosure.

FIG. 5 is view illustrating an interior of an auto-steering device according to various embodiments of the present disclosure.

In detail, FIG. 5 illustrates the interior in a closed state of the auto-steering device 100.

Referring to FIG. 5, the auto-steering device 100 includes the rotation assembly 110, the frame assembly 120, the motor 130, and the reducer 140. A detailed configuration of the auto-steering device 100 is the same as that previously described in FIG. 3.

The auto-steering device 100 may be opened or closed as the frame assembly 120 is opened or closed.

The frame assembly 120 may be opened or closed. After the rotation assembly 110 is coupled to the pillar of the steering wheel, when the driver wants to automatically control the steering wheel using the auto-steering device 100, the frame assembly 120 is coupled to the rotation assembly 110, and when the driver of the agricultural machine wants to manually control the steering wheel without the auto-steering device 100, the frame assembly 120 is not coupled to the rotation assembly 110. One 121 of the second gears is disposed in an open portion of the frame assembly 120, and the other 122 of the second gears is disposed on a body portion of the frame assembly 120. When the frame assembly 120 is closed, the one 121 of the second gears and the other 122 of the second gears together constitute a circular shape.

Figure 6:
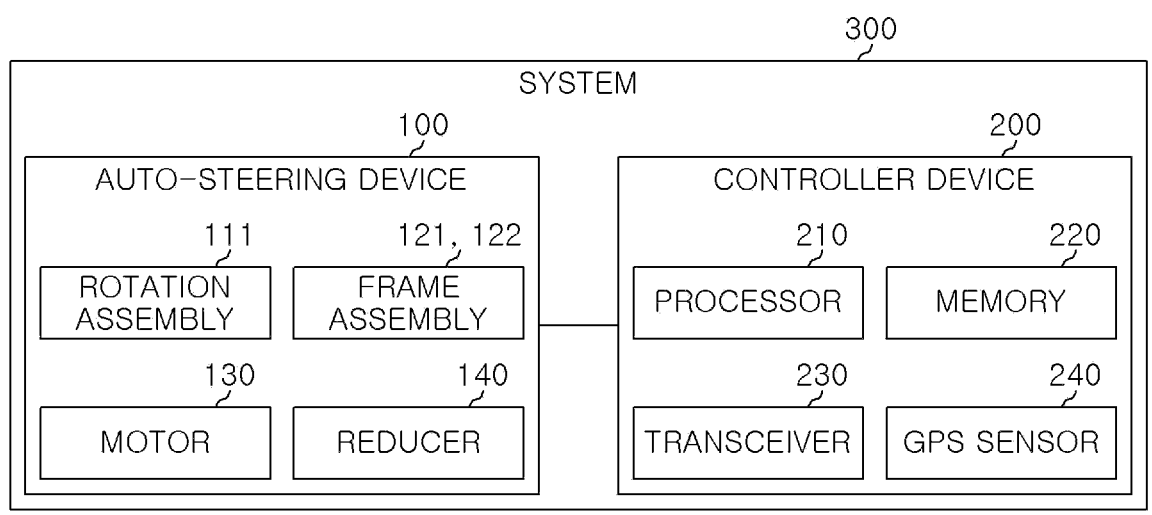
FIG. 6 is a view illustrating a configuration of a system for automatically rotating a steering wheel of an agricultural machine according to various embodiments of the present disclosure.

FIG. 6 is a view illustrating a configuration of a system for automatically rotating a steering wheel of an agricultural machine according to various embodiments of the present disclosure.

Referring to FIG. 6, a system 300 for automatically rotating a steering wheel of an agricultural machine according to various embodiments of the present disclosure includes the auto-steering device 100 and the controller device 200.

The auto-steering device 100 and the controller device 200 are electrically connected to each other. According to an embodiment, the auto-steering device 100 may be coupled to the steering wheel of the agricultural machine, the controller device 200 may be disposed near the driver seat and inside the agricultural machine, and the auto-steering device 100 and the controller device 200 may be connected to each other through an electric line. The controller device 200 may be connected to a user terminal of the user for the agricultural machine or a server of an agricultural machine manufacturer remotely using wireless communication to receive information related to autonomous driving control of the agricultural machine. The controller device 200 may perform control such that a control signal is transmitted to the auto-steering device 100 based on the information related to autonomous driving control, which is received from the user terminal or the server, and the steering wheel of the agricultural machine rotates in an appropriate direction to an appropriate degree at an appropriate time point during working of the agricultural machine.

The auto-steering device 100 includes the rotation assembly 110, the frame assembly 120, the motor 130, and the reducer 140.

The rotation assembly 110 includes the opening in the inner surface thereof, and the opening surrounds the circumference of the pillar of the steering wheel of the agricultural machine and is fitted onto the pillar of the steering wheel. The rotation assembly 110 has the first gear 111 disposed on the outer surface thereof.

The frame assembly 120 includes the central opening surrounding the steering wheel and the rotation assembly 110, and the second gears 121 and 122 are arranged on the inner surface of the central opening. The second gears 121 and 122 are engaged with the first gear 111. The frame assembly 120 may be opened or closed. After the rotation assembly 110 is coupled to the pillar of the steering wheel, when the driver wants to automatically control the steering wheel using the auto-steering device 100, the frame assembly 120 is coupled to the rotation assembly 110, and when the driver of the agricultural machine wants to manually control the steering wheel without the auto-steering device 100, the frame assembly 120 is not coupled to the rotation assembly 110. One 121 of the second gears is disposed in an open portion of the frame assembly 120, and the other 122 of the second gears is disposed on a body portion of the frame assembly 120. When the frame assembly 120 is closed, the one 121 of the second gears and the other 122 of the second gears together constitute a circular shape.

The motor 130 is disposed inside the frame assembly 120. The motor 130 is configured to rotate the second gears 121 and 122, rotate the rotation assembly 110 coupled to the pillar of the steering wheel through the first gear 111 engaged with the second gears 121 and 122, and accordingly, rotate the steering wheel. The motor 130 operates under the control of the controller device 200 that is electrically connected to the auto-steering device 100.

The reducer 140 is disposed inside the frame assembly 120. The reducer 140 is disposed between the second gears 121 and 122 and the motor 130. The reducer 140 is configured to decrease the number of rotations of the motor 130 and transmit a driving force having a decreased number of rotations to the second gears 121 and 122. The reducer 140 operates under the control of the controller device 200 that is electrically connected to the auto-steering device 100.

According to various embodiments of the present disclosure, an output torque of the auto-steering device 100 may correspond to a product of a torque of the motor 130, a reduction ratio of the reducer 140, efficiency based on the reduction ratio of the reducer 140, and gear ratios between the first gear 111 and the second gears 121 and 122.

In Western countries such as the United States, an agricultural environment is field-oriented and roads are well paved. However, in Korea and Asian countries, the agricultural environment is rice field-oriented as in rice farming, and roads around the rice field are often unpaved. In the rice field or reclaimed land, wheels of the agricultural machine are largely submerged in mud, and thus a torque required for controlling the steering wheel of the agricultural machine in the rice field or reclaimed land is significantly greater than a torque required for controlling the steering wheel of the agricultural machine on a paved road or field.

According to various embodiments of the present disclosure, the output torque of the auto-steering device 100 may be designed to be high so that the steering wheel of the agricultural machine rotates without difficulty in harsh environments such as rice farming.

According to various embodiments of the present disclosure, a gear ratio between the first gear 111 and the second gears 121 and 122 may be 3:1, and a rated torque of the motor 130 may be 0.13 Nm. Based on these conditions, when the reduction ratio of the reducer 140 is 30.00 and an efficiency of the reducer 140 is 55%, a rated output torque of the auto-steering device 100 for controlling the steering wheel may be 6.44 Nm.

According to various embodiments of the present disclosure, a gear ratio between the first gear 111 and the second gears 121 and 122 may be 3:1, and a rated torque of the motor 130 may be 0.13 Nm. Based on these conditions, when the reduction ratio of the reducer 140 is 15.00 and the efficiency of the reducer 140 is 65%, a rated output torque of the auto-steering device 100 for controlling the steering wheel may be 3.80 Nm.

According to various embodiments of the present disclosure, a gear ratio between the first gear 111 and the second gears 121 and 122 may be 3:1, and a rated torque of the motor 130 may be 0.13 Nm. Based on these conditions, when the reduction ratio of the reducer 140 is 10.00 and the efficiency of the reducer 140 is 70%, a rated output torque of the auto-steering device 100 for controlling the steering wheel may be 2.73 Nm.

The controller device 200 includes a processor 210, a memory 220, a transceiver 230, and a global positioning system (GPS) sensor 240.

The processor 210 may be configured to implement control for the auto-steering device 100. The processor 210 controls the overall operations of the system 300 for automatically rotating a steering wheel of an agricultural machine. For example, the processor 210 transmits or receives information or the like through the transceiver 230. Further, the processor 210 writes and reads data into and from the memory 220. The GPS sensor 240 is controlled to identify a GPS position of the controller device 200. Further, the processor 210 controls operations of the motor 130 and the reducer 140 in the auto-steering device 100. The processor 210 may include at least one processor.

The memory 220 may be connected to the transceiver 230 and store information received through communication. Further, the memory 220 may be connected to the processor 210 and store data such as a basic program, an application program, setting information, information generated by calculation by the processor 210, and the like for operating the processor 210. The memory 220 may be a volatile memory, a non-volatile memory, or a combination of the volatile memory and the non-volatile memory. Further, the memory 220 may provide the stored data according to the request of the processor 210.

The transceiver 230 is connected to the processor 210 and transmits and/or receives signals. The entirety or a portion of the transceiver 230 may be referred to as a transmitter, a receiver, or a transceiver. The transceiver 230 may support at least one of the various wireless communication standards such as an Institute of Electrical and Electronics Engineers (IEEE) 802.xx system, an IEEE Wi-Fi system, a $3^{rd}$ generation partnership project (3GPP) system, a 3GPP long term evolution (LTE) system, a 3GPP 5G new radio (NR) system, a 3GPP2 system, and Bluetooth that are wireless access systems.

The GPS sensor 240 is configured to determine the GPS position of the controller device 200. The GPS sensor 240 receives signals transmitted from three or more GPS satellites and determines positions of the satellites and the GPS sensor 240. Distances between the GPS satellites and the GPS sensor 240 may be obtained by measuring a time difference between the signals transmitted from the GPS satellites and the signals received by the GPS sensor 240. In this case, the signals transmitted from the GPS satellites include information on locations of the GPS satellites. When the distances from three or more GPS satellites and the location of each of the GPS satellites are identified, the location of the GPS sensor 240 can be calculated using a method such as trilateration. The GPS position of the agricultural machine to which the controller device 200 is physically coupled can be determined using the GPS sensor 240.

According to various embodiments of the present disclosure, the reducer 140 may be configured to shift gears at a ratio in which the numbers of rotations of the second gears 121 and 122 are reduced as compared to the number of rotations of the motor 130, and the processor 210 may be further configured to perform gear shift control for the reducer 140.

According to various embodiments of the present disclosure, the processor 210 may be configured to control the transceiver 230 to transmit, to the server, a request for information on the type of land corresponding to the GPS position of the controller device 200 sensed by the GPS sensor 240, and may be further configured to control the transceiver 230 to receive the information on the type of land from the server, to determine a gear shift operation of the reducer 140 based on the type of land, and to perform gear shift control for the reducer 140 based on the determined gear shift operation.

According to various embodiments of the present disclosure, the type of land is one of a paved road, an unpaved road, a field, a rice field, and a reclaimed land. In the gear shift operation, a reduction ratio is lower in an order of the paved road, the unpaved road, the field, the rice field, and the reclaimed land, that is, the reduction ratio of the paved road is the lowest, and the reduction ratio of the reclaimed land is the highest.

According to various embodiments of the present disclosure, the processor 210 may be configured to control the transceiver 230 to transmit, to the server, the request for the information on the type of land corresponding to the GPS position of the controller device 200 sensed by the GPS sensor 240 and may be further configured to control the transceiver 230 to receive the information on the type of land from the server and to determine an output torque of the auto-steering device 100 based on the type of land. The output torque may correspond to a product of the torque of the motor 130, the reduction ratio of the reducer 140, the efficiency based on the reduction ratio of the reducer 140, and the gear ratios between the first gear 111 and the second gears 121 and 122. The processor 210 may be further configured to determine a gear shift operation of the reducer 140 based on the determined output torque and to perform gear shift control for the reducer 140 based on the determined gear shift operation.

According to various embodiments of the present disclosure, the processor 210 may be further configured to determine the torque of the motor 130 based on the determined output torque and to control an output of the motor 130 based on the determined torque of the motor.

According to various embodiments of the present disclosure, the processor 210 may be further configured to control the transceiver 230 to receive information on a GPS-based movement path of the agricultural machine from the user terminal and to control the motor 130 based on the information on the movement path so that the auto-steering device 100 rotates the steering wheel.

According to various embodiments of the present disclosure, the processor 210 may determine a first line connecting the GPS position of the agricultural device before a unit distance on the movement path and a current GPS position of the controller device 200 and a second line connecting the GPS position of the agricultural device after the unit distance on the movement path and the current GPS position of the controller device 200. The processor 210 may determine whether the steering wheel rotates, a rotational direction of the steering wheel, and a rotational angle of the steering wheel based on an angle between the first line and the second line. The processor 210 may further be configured to control the motor 130 based on whether the steering wheel rotates, the rotational direction of the steering wheel, and the rotational angle of the steering wheel so that the auto-steering device 100 rotates the steering wheel.

According to various embodiments of the present disclosure, the controller device 200 may remotely receive a control signal from an agricultural machine that is distant from the user for the agricultural machine through wireless communication and may control the auto-steering device 100 based on the control signal to remotely and automatically control the steering wheel of the agricultural machine.

According to various embodiments of the present disclosure, the controller device 200 may determine, based on the GPS position, whether the agricultural machine performs work in the rice field or the reclaimed land, whether the agricultural machine performs work in the field, whether the agricultural machine moves on the unpaved road, or whether the agricultural machine moves on the paved road. Further, in order to rotate the steering wheel of the agricultural machine without difficulty according to environments, the controller device 200 may control at least one of the reduction ratio of the reducer 140 and the torque of the motor 130 to adjust the output torque of the auto-steering device 100.

In the embodiments described above, components and features of the present disclosure are combined in a predetermined form. The components or features should be considered to be optional unless explicitly stated otherwise. The components or features may be implemented in a form in which the components or features are not combined with the other components or features. Further, the embodiments of the present disclosure may be configured by combining some components and/or features. An order of operations described in the embodiments of the present disclosure may be changed. Some components or features of one embodiment may be included in another embodiment or may be replaced with components and features corresponding to another embodiment. It is obvious that an embodiment may be configured by combining claims that are not explicitly cited in the appended claims or include a novel claim by amendment after filing.

It is apparent to those skilled in the art to which the present disclosure pertains that the present disclosure may be embodied in other forms without departing from the technical ideas and essential features of the present disclosure. Thus, the embodiments should be considered in all aspects as illustrative rather than limitative. The scope of rights of the present disclosure should be determined by reasonable interpretation of the appended claims and all possible changes within the equivalent scope of the present disclosure.

The present disclosure relates to a system for automatically rotating a steering wheel of an agricultural machine. In detail, the present disclosure relates to a system for performing autonomous driving on an agricultural machine by automatically rotating a steering wheel in combination with a steering wheel of the agricultural machine.

What is claimed is:

1. A system for automatically rotating a steering wheel of an agricultural machine, the system comprising an auto-steering device,
wherein the auto-steering device includes:
a rotation assembly surrounding a circumference of a pillar of the steering wheel and coupled to the pillar, wherein the rotation assembly has an opening through which the pillar of the steering wheel is inserted, and wherein a first gear is disposed on a circumference of an outer surface of the rotation assembly;

a frame assembly including a central opening surrounding the rotation assembly, wherein the pillar of the steering wheel is inserted into the central opening, wherein a second gear, which engages with the first gear, is disposed on an inner surface of the central opening;

wherein the rotation assembly, the frame assembly, the first gear and the second gear are concentrically arranged around the pillar;

a motor configured to rotate the second gear to rotate the rotation assembly and the steering wheel through the first gear; and a reducer disposed between the second gear and the motor and configured to decrease a number of rotations of the motor to transmit a driving force having a decreased number of rotations to the second gear.

2. The system of claim 1, wherein a gear ratio between the first gear and the second gear is 3:1, and a rated torque of the motor is 0.13 Nm.

3. The system of claim 2, wherein when a reduction ratio of the reducer is 30.00 and an efficiency of the reducer is 55%, a rated output torque of the auto-steering device for controlling the steering wheel is 6.44 Nm.

4. The system of claim 2, wherein when a reduction ratio of the reducer is 15.00 and an efficiency of the reducer is 65%, a rated output torque of the auto-steering device for controlling the steering wheel is 3.80 Nm.

5. The system of claim 2, wherein when a reduction ratio of the reducer is 10.00 and an efficiency of the reducer is 70%, a rated output torque of the auto-steering device for controlling the steering wheel is 2.73 Nm.

* * * * *